US012559176B2

(12) United States Patent
Shimanaka et al.

(10) Patent No.: US 12,559,176 B2
(45) Date of Patent: Feb. 24, 2026

(54) VEHICLE COLLISION AVOIDANCE ASSIST APPARATUS

(71) Applicant: TOYOTA JIDOSHA KABUSHIKI KAISHA, Toyota (JP)

(72) Inventors: Yumi Shimanaka, Kasugai (JP); Kazuya Okamoto, Toyota (JP); Sho Hashimoto, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/766,820

(22) Filed: Jul. 9, 2024

(65) Prior Publication Data

US 2024/0359741 A1     Oct. 31, 2024

Related U.S. Application Data

(63) Continuation of application No. 17/650,901, filed on Feb. 14, 2022, now Pat. No. 12,060,104.

(30) Foreign Application Priority Data

Mar. 1, 2021    (JP) ................................. 2021-031514

(51) Int. Cl.
  *B62D 15/02*        (2006.01)
  *B60Q 9/00*        (2006.01)
  *G08G 1/16*        (2006.01)
(52) U.S. Cl.
  CPC ......... *B62D 15/0265* (2013.01); *B60Q 9/008* (2013.01); *B62D 15/029* (2013.01); *G08G 1/16* (2013.01)

(58) Field of Classification Search
  CPC .. B62D 15/0265; B62D 15/029; B60Q 9/008; G08G 1/16; G08G 1/163; G08G 1/166; G08G 1/167; B60W 30/09; B60W 40/02
  See application file for complete search history.

(56) References Cited

U.S. PATENT DOCUMENTS 8,742,906 B2 *  6/2014  Kataoka ................ B60W 50/14
                                                      340/425.5
11,175,673 B2 *  11/2021  Eshima .................. G08G 1/143
                        (Continued)

FOREIGN PATENT DOCUMENTS

CN          102307774 A       1/2012
CN          109591813 A       4/2019
                        (Continued)

OTHER PUBLICATIONS

Chinese Office Action dated Mar. 26, 2025 and English translation.
                        (Continued)

*Primary Examiner* — Kurt Philip Liethen
(74) *Attorney, Agent, or Firm* — Dickinson Wright, PLLC

(57)          ABSTRACT
A vehicle collision avoidance assist apparatus executes a collision avoidance steering maneuvering assist process of applying a steering force to an own vehicle to assist a collision avoidance steering maneuvering carried out by a driver when there is a probability that the own vehicle collides with an object ahead of the own vehicle, and the driver carries out the collision avoidance steering maneuvering to steer the own vehicle to avoid a collision of the own vehicle with the object. The apparatus notifies the driver of a necessity of carrying out the collision avoidance steering maneuvering when determining that there is the possibility that the own vehicle collides with the object ahead of the own vehicle.

6 Claims, 9 Drawing Sheets

(56) References Cited

U.S. PATENT DOCUMENTS

| | | | |
|---|---|---|---|
| 11,577,720 B2 * | 2/2023 | Miyamoto | B60W 30/095 |
| 11,731,619 B2 | 8/2023 | Mariya et al. | |
| 11,760,343 B2 | 9/2023 | Miyamoto et al. | |
| 11,760,344 B2 | 9/2023 | Morotomi et al. | |
| 11,767,057 B2 | 9/2023 | Shimanaka et al. | |
| 12,269,468 B2 * | 4/2025 | Yasui | B60W 30/0956 |
| 2008/0189040 A1 | 8/2008 | Nasu et al. | |
| 2008/0281521 A1 | 11/2008 | Shirato | |
| 2010/0076683 A1 * | 3/2010 | Chou | B60R 1/25 |
| | | | 342/41 |
| 2011/0279254 A1 | 11/2011 | Raste et al. | |
| 2012/0019375 A1 | 1/2012 | Kataoka | |
| 2013/0054128 A1 | 2/2013 | Moshchuk et al. | |
| 2014/0032049 A1 | 1/2014 | Moshchuk et al. | |
| 2014/0229069 A1 | 8/2014 | Akiyama | |
| 2014/0244142 A1 | 8/2014 | Matsubara | |
| 2015/0094943 A1 | 4/2015 | Yoshihama et al. | |
| 2015/0206435 A1 | 7/2015 | Ouchi | |
| 2015/0210279 A1 * | 7/2015 | Agnew | B60W 60/00274 |
| | | | 701/48 |
| 2015/0234044 A1 | 8/2015 | Ouchi | |
| 2015/0336574 A1 * | 11/2015 | Akiyama | G08G 1/16 |
| | | | 701/301 |
| 2017/0008518 A1 | 1/2017 | Arndt et al. | |
| 2017/0057498 A1 | 3/2017 | Katoh | |
| 2018/0043886 A1 | 2/2018 | Keller et al. | |
| 2018/0118203 A1 | 5/2018 | Minemura et al. | |
| 2018/0158334 A1 | 6/2018 | Perez Barrera et al. | |
| 2018/0268696 A1 | 9/2018 | Morotomi et al. | |
| 2019/0100197 A1 | 4/2019 | Saiki | |
| 2019/0202450 A1 | 7/2019 | Maeda et al. | |
| 2019/0263394 A1 | 8/2019 | Williams | |
| 2019/0291730 A1 | 9/2019 | Kamiya et al. | |
| 2020/0023901 A1 | 1/2020 | Modig et al. | |
| 2020/0062248 A1 * | 2/2020 | Hasegawa | B60W 30/0956 |
| 2020/0180611 A1 * | 6/2020 | Klingemann | B60W 50/14 |
| 2020/0238980 A1 | 7/2020 | Goto et al. | |
| 2021/0394752 A1 | 12/2021 | Satoh | |
| 2022/0017079 A1 * | 1/2022 | Kakeshita | B60W 30/09 |

FOREIGN PATENT DOCUMENTS

| | | |
|---|---|---|
| CN | 110745134 A | 2/2020 |
| EP | 2 420 985 A1 | 2/2012 |
| JP | 2005056336 A | 3/2005 |
| JP | 2007039017 A | 2/2007 |
| JP | 2009-015547 A | 1/2009 |
| JP | 2011051571 A | 3/2011 |
| JP | 2017043262 A | 3/2017 |
| JP | 2019043195 A | 3/2019 |

OTHER PUBLICATIONS

Yumi Shimanaka et al., U.S. Appl. No. 17/650,901, filed Feb. 14, 2022.

Yumi Shimanaka et al., U.S. Appl. No. 17/650,901, Non-Final Office Action dated Nov. 20, 2023.

Yumi Shimanaka et al., U.S. Appl. No. 17/650,901, Notice of Allowance dated May 1, 2024.

* cited by examiner

IMG_SW                    IMG_AR

P_SW

IMG_SW                    IMG_AR

P_SW

VEHICLE COLLISION AVOIDANCE ASSIST APPARATUS

RELATED APPLICATIONS

This application is a continuation of U.S. patent application Ser. No. 17/650,901, filed Feb. 14, 2022, which claims priority to Japanese Patent Application No. 2021-031514, filed on Mar. 1, 2021, the entire disclosures of which are incorporated herein by reference.

BACKGROUND

Field

The invention relates to a vehicle collision avoidance assist apparatus.

Description of the Related Art

There is known a vehicle collision avoidance assist apparatus which applies a steering torque or an assist steering torque to a steering shaft to assist a driver's steering wheel maneuvering to surely avoid a collision of an own vehicle with an object when a driver of the own vehicle determines that there is a probability that the own vehicle collides with the object and carries out a steering wheel maneuver to avoid the collision of the own vehicle with the object (for example, see JP 2007-39017 A).

The known vehicle collision avoidance assist apparatus starts applying the assist steering torque to the steering shaft when the driver starts carrying out the steering wheel maneuvering or a collision avoidance steering wheel maneuvering to avoid the collision of the own vehicle with the object. Thus, if the driver starts carrying out the collision avoidance steering wheel maneuvering at a late timing, the driver needs to carry out the great collision avoidance steering wheel maneuvering. In addition, the vehicle collision avoidance assist apparatus needs to apply the great assist steering torque to the steering shaft. As a result, the collision of the own vehicle with the object may not be safely avoided.

SUMMARY

An object of the invention is to provide a vehicle collision avoidance assist apparatus which can cause the driver to start carrying out the collision avoidance steering wheel at an early timing.

According to the invention, a vehicle collision avoidance assist apparatus comprises an electronic control unit configured to execute a collision avoidance steering maneuvering assist process of applying a steering force to an own vehicle to assist a collision avoidance steering maneuvering carried out by a driver of the own vehicle when there is a probability that the own vehicle collides with an object ahead of the own vehicle, and the driver carries out the collision avoidance steering maneuvering to steer the own vehicle to avoid a collision of the own vehicle with the object.

The vehicle collision avoidance assist apparatus comprises a surrounding information detection apparatus which detects information on a situation around the own vehicle including a situation ahead of the own vehicle. The electronic control unit is configured to notify the driver of a necessity of carrying out the collision avoidance steering maneuvering when the electronic control unit determines that there is the possibility that the own vehicle collides with the object ahead of the own vehicle, based on the information detected by the surrounding information detection apparatus.

With this invention, when there is the probability that the own vehicle collides with the object, and the vehicle collision avoidance assist apparatus determines that the driver needs to carry out the collision avoidance steering maneuvering, the vehicle collision avoidance assist apparatus notifies the driver of the necessity of carrying out the collision avoidance steering maneuvering. Thereby, even when the driver does not recognize the necessity of carrying out the collision avoidance steering maneuvering, the vehicle collision avoidance assist apparatus can cause the driver to recognize the necessity of carrying out the collision avoidance steering maneuvering. Thus, the vehicle collision avoidance assist apparatus can cause the driver to start carrying out the collision avoidance steering maneuvering at an early timing and as a result, can avoid the collision of the own vehicle with the object safely.

According to an aspect of the invention, when (i) the own vehicle needs to be turned to one direction and then to an opposite direction to the one direction to avoid the collision of the own vehicle with the object, and (ii) the own vehicle reaches a point where the own vehicle needs to be turned to the opposite direction, the electronic control unit may be configured to notify the driver of the necessity of carrying out the collision avoidance steering maneuvering to turn the own vehicle to the opposite direction.

With this aspect of the invention, the vehicle collision avoidance assist apparatus can prompt the driver to carry out the desired collision avoidance steering maneuvering to avoid the collision of the own vehicle with the object safely after the driver starts carrying out the collision avoidance steering maneuvering.

According to another aspect of the invention, when the electronic control unit starts executing the collision avoidance steering maneuvering assist process, the electronic control unit may be configured to set, as a target collision avoidance route, a moving route of the own vehicle for avoiding the collision of the own vehicle with the object. Further, when the own vehicle deviates from the target collision avoidance route by a predetermined distance, the electronic control unit may be configured to notify the driver of the necessity of carrying out the collision avoidance steering maneuvering to a direction to cause the own vehicle to approach the target collision avoidance route.

With this aspect of the invention, the vehicle collision avoidance assist apparatus can prompt the driver to carry out the desired collision avoidance steering maneuvering to avoid the collision of the own vehicle with the object safely after the driver starts carrying out the collision avoidance steering maneuvering.

According to further another aspect of the invention, the vehicle collision avoidance assist apparatus may comprise a display apparatus which displays an image. In this aspect, the electronic control unit may be configured to notify the driver of the necessity of carrying out the collision avoidance steering maneuvering by causing the display apparatus to display the image which shows the necessity of carrying out the collision avoidance steering maneuvering.

Providing the driver with the image which shows the necessity of carrying out the collision avoidance steering maneuvering can cause the driver to intuitively recognize the necessity of carrying out the collision avoidance steering maneuvering. With this aspect of the invention, the vehicle collision avoidance assist apparatus notifies the driver of the necessity of carrying out the desired collision avoidance steering maneuvering by displaying the image. Thus, the vehicle collision avoidance assist apparatus can surely cause the driver to recognize the necessity of carrying out the desired collision avoidance steering maneuvering.

According to further another aspect of the invention, the vehicle collision avoidance assist apparatus may comprise a steering wheel maneuvered by the driver to steer the own vehicle. In this aspect, the electronic control unit may be configured to notify the driver of the necessity of carrying out the collision avoidance steering maneuvering by causing the display apparatus to display the image illustrating the steering wheel with the image illustrating a direction in which the driver needs to maneuver the steering wheel to avoid the collision of the own vehicle with the object.

Notifying the driver of the necessity of carrying out the desired collision avoidance steering maneuvering by the image illustrating the steering wheel with the image illustrating the direction in which the driver needs to maneuver the steering wheel, can cause the driver to intuitively recognize how to carry out the desired collision avoidance steering maneuvering. With this aspect of the invention, the vehicle collision avoidance assist apparatus notifies the driver of the necessity of carrying out the desired collision avoidance steering maneuvering by displaying the image illustrating the steering wheel with the image illustrating the direction in which the driver needs to maneuver the steering wheel. Thus, the vehicle collision avoidance assist apparatus can surely cause the driver to recognize the necessity of carrying out the desired collision avoidance steering maneuvering.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
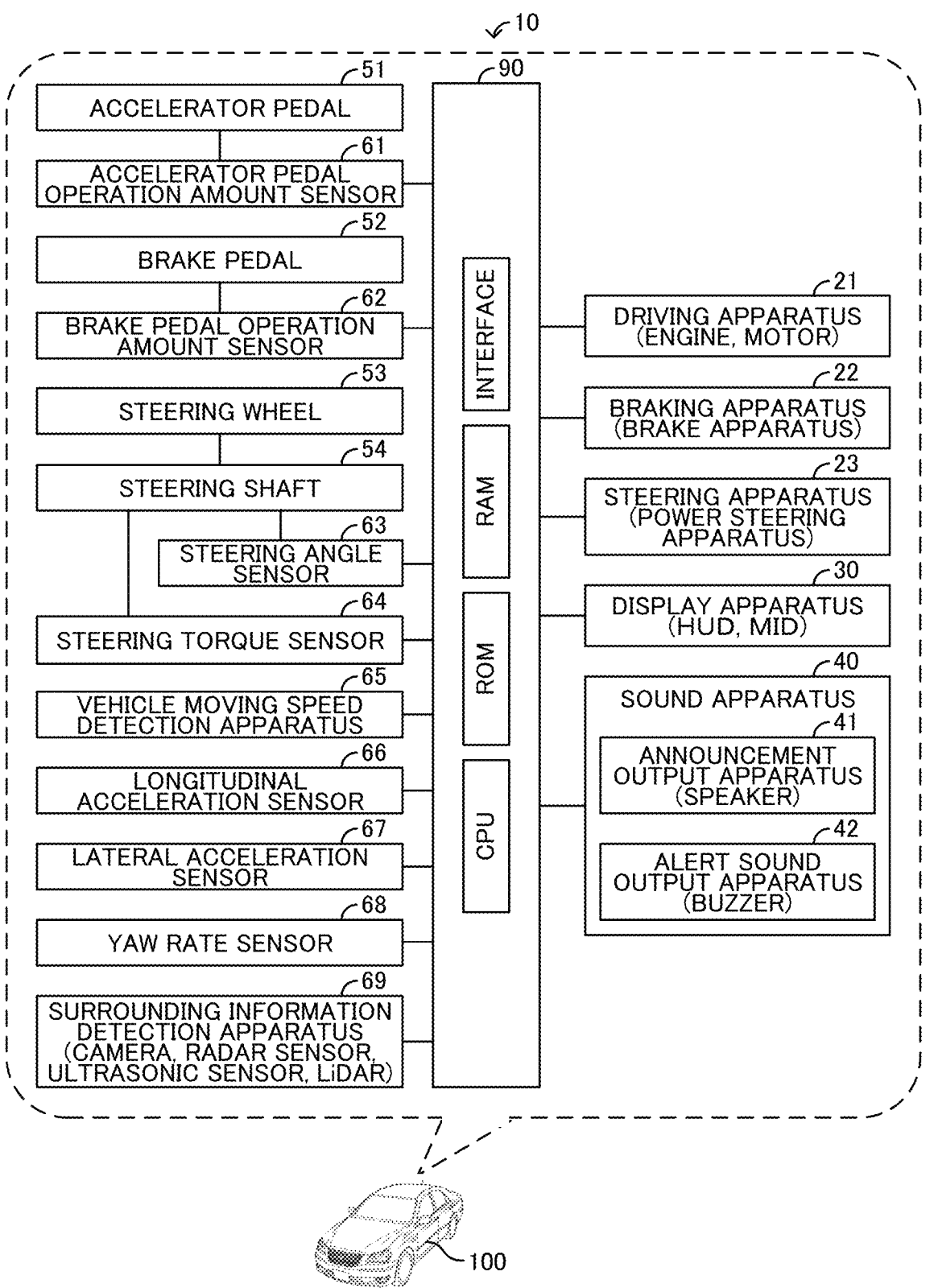
FIG. 1 is a view which shows a vehicle collision avoidance assist apparatus according to an embodiment of the invention and an own vehicle in which the vehicle collision avoidance assist apparatus is installed.

Below, a vehicle collision avoidance assist apparatus according to an embodiment of the invention will be described with reference to the drawings. As shown in FIG. 1, the vehicle collision avoidance assist apparatus 10 according to the embodiment of the invention is installed in an own vehicle 100.

<ECU>

The vehicle collision avoidance assist apparatus 10 includes an ECU 90. ECU stands for electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines memorized in the ROM.

<Driving Apparatus, Etc.>

A driving apparatus 21, a braking apparatus 22, and a steering apparatus 23 are installed on the own vehicle 100.

<Driving Apparatus>

The driving apparatus 21 is an apparatus which outputs a driving torque TQ_D or a driving force applied to the own vehicle 100 to move the own vehicle 100. The driving apparatus 21 includes, for example, an internal combustion engine and/or at least one electric motor. The driving apparatus 21 is electrically connected to the ECU 90. The ECU 90 can control the driving torque TQ_D output from the driving apparatus 21 by controlling activations of the driving apparatus 21.

<Braking Apparatus

The braking apparatus 22 is an apparatus which outputs a braking torque TQ_B or a braking force applied to the own vehicle 100 to brake the own vehicle 100. The braking apparatus 22 is, for example, a brake apparatus. The braking apparatus 22 is electrically connected to the ECU 90. The ECU 90 can control the braking torque TQ_B output from the braking apparatus 22 by controlling activations of the braking apparatus 22.

<Steering Apparatus>

The steering apparatus 23 is an apparatus which outputs a steering torque TQ_S or a steering force applied to the own vehicle 100 to steer the own vehicle 100. The steering apparatus 23 is, for example, a power steering apparatus. The steering apparatus 23 is electrically connected to the ECU 90. The ECU 90 can control the steering torque TQ_S output from the steering apparatus 23 by controlling activations of the steering apparatus 23.

<Display Apparatus>

Further, a display apparatus 30 is installed on the own vehicle 100. The display apparatus 30 is an apparatus which displays various images to enable a driver of the own vehicle 100 to see. The display apparatus 30 is, for example, a head-up display, a multi-information display, or a display of a navigation device. The head-up display is the display apparatus which displays the images by projecting the images on a front windshield of the own vehicle 100. The multi-information display is the display apparatus which is provided in a combination meter installed in an instrument panel of the own vehicle 100 and displays the images. The navigation device is a device which displays a position of the own vehicle 100 by displaying a map and the position of the own vehicle 100 on the display and provides the driver with a route to a destination.

The display apparatus 30 is electrically connected to the ECU 90. The ECU 90 can cause the display apparatus 30 to display the various images.

<Sound Apparatus>

Furthermore, a sound apparatus 40 is installed on the own vehicle 100. The sound apparatus 40 is an apparatus which outputs sound. The sound apparatus 40 includes an announcement output apparatus 41 and an alert sound output apparatus 42. The announcement output apparatus 41 is an apparatus which outputs various announcements. The announcement output apparatus 41 is, for example, a speaker. The alert sound output apparatus 42 is an apparatus which outputs various alert sounds. The alert sound output apparatus 42 is, for example, a buzzer.

The sound apparatus 40 is electrically connected to the ECU 90. The ECU 90 can output the various announcements and the various alert sounds from the sound apparatus 40.

<Sensors, Etc.>

Furthermore, an accelerator pedal 51, a brake pedal 52, a steering wheel 53, a steering shaft 54, an accelerator pedal operation amount sensor 61, a brake pedal operation amount sensor 62, a steering angle sensor 63, a steering torque sensor 64, a vehicle moving speed detection apparatus 65, a longitudinal acceleration sensor 66, a lateral acceleration sensor 67, a yaw rate sensor 68, and a surrounding information detection apparatus 69.

<Accelerator Pedal Operation Amount Sensor>

The accelerator pedal operation amount sensor 61 is a sensor which detects an operation amount of the accelerator pedal 51. The accelerator pedal operation amount sensor 61 is electrically connected to the ECU 90. The accelerator pedal operation amount sensor 61 sends information on the detected operation amount of the accelerator pedal 51 to the ECU 90. The ECU 90 acquires the operation amount of the accelerator pedal 51 as an accelerator pedal operation amount AP, based on the information sent from the accelerator pedal operation amount sensor 61.

The ECU 90 calculates and acquires a requested driving torque TQ_D_req or a requested driving force, based on the accelerator pedal operation amount AP and a vehicle moving speed SPD of the own vehicle 100. The requested driving torque TQ_D_req is the driving torque TQ_D which is requested to be output from the driving apparatus 21. The ECU 90 controls the activations of the driving apparatus 21 so as to output the driving torque corresponding to the requested driving torque TQ_D_req.

<Brake Pedal Operation Amount Sensor>

The brake pedal operation amount sensor 62 is a sensor which detects an operation amount of the brake pedal 52.

The brake pedal operation amount sensor 62 is electrically connected to the ECU 90. The brake pedal operation amount sensor 62 sends information on the detected operation amount of the brake pedal 52 to the ECU 90. The ECU 90 acquires the operation amount of the brake pedal 52 as a brake pedal operation amount BP, based on the information sent from the brake pedal operation amount sensor 62.

The ECU 90 calculates and acquires a requested braking torque TQ_B_req or a requested braking force, based on the brake pedal operation amount BP. The requested braking torque TQ_B_req is the braking torque TQ_B which is requested to be output from the braking apparatus 22. The ECU 90 controls the activations of the braking apparatus 22 so as to output the braking torque corresponding to the requested braking torque TQ_B_req.

<Steering Angle Sensor>

The steering angle sensor 63 is a sensor which detects a rotation angle of the steering shaft 54 with respect to a neutral position. The steering angle sensor 63 is electrically connected to the ECU 90. The steering angle sensor 63 sends information on the detected rotation angle of the steering shaft 54 to the ECU 90. The ECU 90 acquires the rotation angle of the steering shaft 54 as a steering angle □steer, based on the information sent from the steering angle sensor 63.

<Steering Torque Sensor>

The steering torque sensor 64 is a sensor which detects a torque which the driver inputs to the steering shaft 54 via the steering wheel 53. The steering torque sensor 64 is electrically connected to the ECU 90. The steering torque sensor 64 sends information on the detected torque to the ECU 90. The ECU 90 acquires the torque or a driver input torque TQ_S_driver which the driver inputs to the steering shaft 54 via the steering wheel 53, based on the information sent from the steering torque sensor 64.

<Vehicle Moving Speed Detection Apparatus>

The vehicle moving speed detection apparatus 65 is an apparatus which detects a vehicle moving speed of the own vehicle 100. The vehicle moving speed detection apparatus 65 includes, for example, vehicle wheel rotation speed sensors. The vehicle moving speed detection apparatus 65 is electrically connected to the ECU 90. The vehicle moving speed detection apparatus 65 sends information on the detected vehicle moving speed to the ECU 90. The ECU 90 acquires a vehicle moving speed SPD of the own vehicle 100, based on the information sent from the vehicle moving speed detection apparatus 65.

The ECU 90 calculates and acquires a requested steering torque TQ_S_req, based on the acquired steering angle □steer, the acquired driver input torque TQ_S_driver, and the acquired vehicle moving speed SPD. The requested steering torque TQ_S_req is the steering torque TQ_S which is requested to be output from the steering apparatus 23. The ECU 90 controls the activations of the steering apparatus 23 so as to output the steering torque corresponding to the requested steering torque TQ_S_req. It should be noted that when the ECU 90 executes a steering wheel maneuvering assist process described later, the ECU 90 appropriately determines, as the requested steering torque TQ_S_req, the steering torque TQ_S necessary to move the own vehicle 100 along a target collision avoidance route Rtgt, independently of the steering angle □steer and the like, and controls the activations of the steering apparatus 23 to output the steering torque corresponding to the requested steering torque TQ_S_req.

<Longitudinal Acceleration Sensor>

The longitudinal acceleration sensor 66 is a sensor which detects a longitudinal acceleration of the own vehicle 100. The longitudinal acceleration sensor 66 is electrically connected to the ECU 90. The longitudinal acceleration sensor 66 sends information on the detected longitudinal acceleration to the ECU 90. The ECU 90 acquires the longitudinal acceleration of the own vehicle 100 as a longitudinal acceleration value Gx, based on the information sent from the longitudinal acceleration sensor 66.

<Lateral Acceleration Sensor>

The lateral acceleration sensor 67 is a sensor which detects a lateral or width-direction acceleration of the own vehicle 100. The lateral acceleration sensor 67 is electrically connected to the ECU 90. The lateral acceleration sensor 67 sends information on the detected lateral acceleration to the ECU 90. The ECU 90 acquires the lateral acceleration of the own vehicle 100 as a lateral acceleration value Gy, based on the information sent from the lateral acceleration sensor 67.

<Yaw Rate Sensor>

The yaw rate sensor 68 is a sensor which detects a yaw rate YR of the own vehicle 100. The yaw rate sensor 68 is electrically connected to the ECU 90. The yaw rate sensor 68 sends information on the detected yaw rate YR to the ECU 90. The ECU 90 acquires the yaw rate YR of the own vehicle 100, based on the information sent from the yaw rate sensor 68.

<Surrounding Information Detection Apparatus>

The surrounding information detection apparatus 69 is an apparatus which detects information around the own vehicle 100. The surrounding information detection apparatus 69 includes, for example, cameras, radar sensors such as millimeter wave radars, ultrasonic wave sensors such as clearance sonars, and laser radars such as LiDAR.

The surrounding information detection apparatus 69 is electrically connected to the ECU 90. The surrounding information detection apparatus 69 detects the information around the own vehicle 100 and sends the detected information or surrounding information I_S to the ECU 90.

The ECU 90 can detect objects ahead of the own vehicle 100, based on the surrounding information I_S, in particular, information on a situation ahead of the own vehicle 100. Further, when the ECU 90 detects the objects, the ECU 90 acquires (i) a distance between each object and the own vehicle 100 or an object distance D200 and (ii) a speed of each object with respect to the own vehicle 100 or a relative speed dSPD, based on the surrounding information I_S.

Figure 2A:
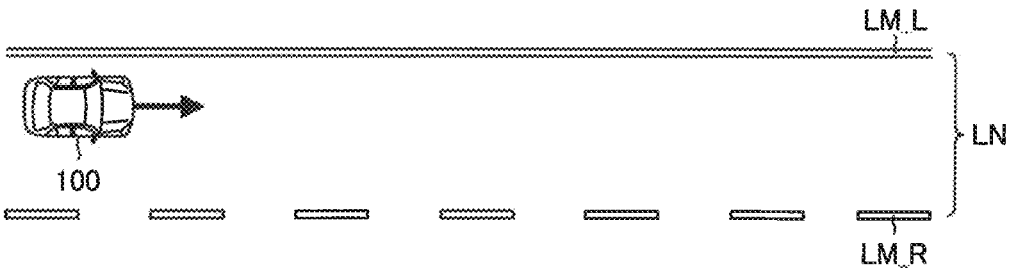
FIG. 2A is a view which shows lane markings which define a moving lane in which the own vehicle moves or an own vehicle moving lane.
Figure 2B:
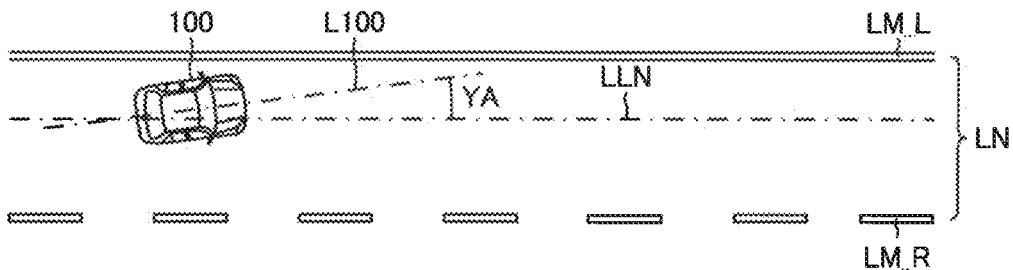
FIG. 2B is a view which shows a yaw angle of the own vehicle.
Figure 2C:
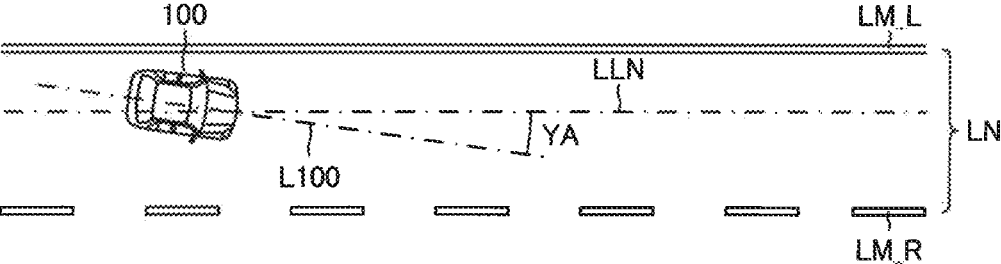
FIG. 2C is a view which shows the yaw angle of the own vehicle.

Furthermore, as shown in FIG. 2A, the ECU 90 can recognize a left lane marking LM_L and a right lane marking LM_R, based on the surrounding information I_S. The left lane marking LM_L and the right lane marking LM_R define a traffic lane in which the own vehicle 100 moves or an own vehicle moving lane LN. When the ECU 90 recognizes the left and right lane markings LM, i.e., the left lane marking LM_L and the right lane marking LM_R, the ECU 90 can acquire a yaw angle □yaw, based on the left and right lane markings LM. As shown in FIG. 2B and FIG. 2C, the yaw angle □yaw is an angle which is defined by an own vehicle moving lane extension line LLN and an own vehicle longitudinal center line L100. The own vehicle moving lane extension line LLN is a line which represents a direction in which the own vehicle moving lane LN extends. The own vehicle longitudinal center line L100 is a line which extends in a longitudinal direction of the own vehicle 100 through a width center portion of the own vehicle 100. The width center portion of the own vehicle 100 is a center of the own vehicle 100 in a width direction of the own vehicle 100. Furthermore, the ECU 90 can specify a breadth of the own vehicle moving lane LN, based on the recognized left and right lane markings LM.

<Summary of Operations of Vehicle Collision Avoidance Assist Apparatus>

Next, a summary of operations of the vehicle collision avoidance assist apparatus 10 will be described. While the own vehicle 100 moves, the vehicle collision avoidance assist apparatus 10 is determining, based on the surrounding information I_S, in particular, the information on the situation ahead of the own vehicle 100, whether there is an object ahead of the own vehicle 100 in a moving direction of the own vehicle 100. In particular, while the own vehicle 100 moves, the vehicle collision avoidance assist apparatus 10 is determining, based on the surrounding information I_S, whether there is an object in an own vehicle moving area A100.

Figure 3A:
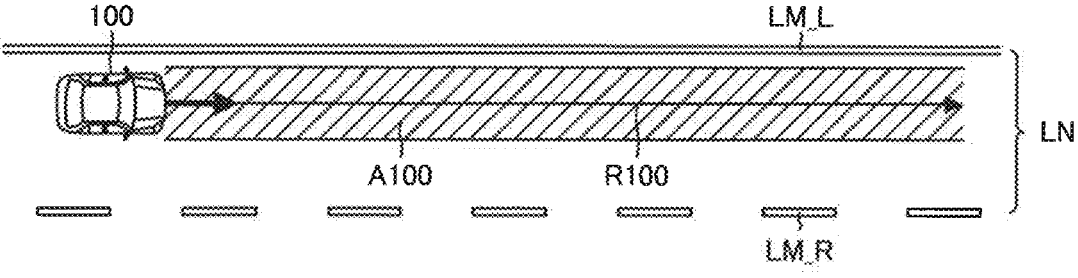
FIG. 3A is a view which shows an own vehicle moving area.

As shown in FIG. 3A, the own vehicle moving area A100 is an area which has a center line corresponding to a moving route R100 of the own vehicle 100 and a breadth equal to a width of the own vehicle 100. The moving route R100 of the own vehicle 100 is a route which the own vehicle 100 moves assuming that the own vehicle 100 moves with keeping the current steering angle □steer. In this embodiment, the object is, for example, a vehicle, a person, or a bicycle.

When there is no object in the own vehicle moving area A100, the vehicle collision avoidance assist apparatus 10 executes a normal moving control. When there is the object in the own vehicle moving area A100 but the own vehicle 100 has a low probability of colliding with the object in the own vehicle moving area A100, the vehicle collision avoidance assist apparatus 10 also executes the normal moving control.

The normal moving control is a control of (i) controlling the activations of the driving apparatus 21 so as to output the driving torque corresponding to the requested driving torque TQ_D_req when the requested driving torque TQ_D_req or the requested driving force is greater than zero, (ii) controlling the activations of the braking apparatus 22 so as to output the braking torque corresponding to the requested braking torque TQ_B_req when the requested braking torque TQ_B_req or the requested braking force is greater than zero, and (iii) controlling the activations of the steering apparatus 23 so as to output the steering torque corresponding to the requested steering torque TQ_S_req when the requested steering torque TQ_S_req or the requested steering force is greater than zero.

Figure 3B:
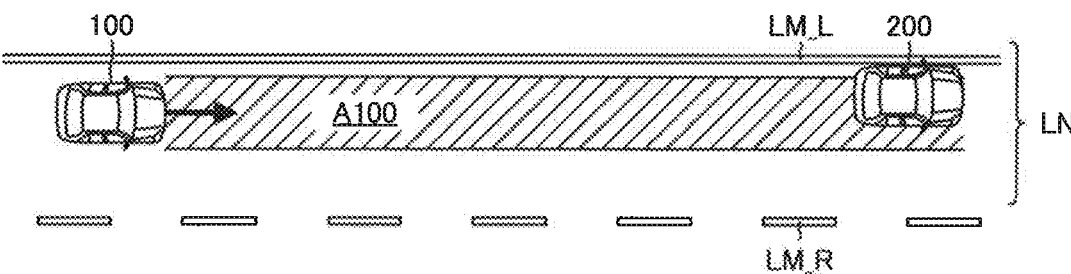
FIG. 3B is a view which shows a scene that an object or a vehicle is in the own vehicle moving area.

As shown in FIG. 3B, when the vehicle collision avoidance assist apparatus 10 determines that there is the object 200 in the own vehicle moving area A100, the vehicle collision avoidance assist apparatus 10 acquires the object distance D200 and the relative speed dSPD, based on the surrounding information I_S as described above. Then, the vehicle collision avoidance assist apparatus 10 calculates and acquires a predicted reaching time TTC, based on the acquired object distance D200 and the acquired relative speed dSPD.

The predicted reaching time TTC is a time predictively taken until the own vehicle 100 reaches the object 200. The vehicle collision avoidance assist apparatus 10 acquires the predicted reaching time TTC by dividing the object distance D200 by the relative speed dSPD (TTC=D200/dSPD). While the vehicle collision avoidance assist apparatus 10 determines that there is the object 200 in the own vehicle moving area A100, the vehicle collision avoidance assist apparatus 10 repeatedly acquires the object distance D200, the relative speed dSPD, and the predicted reaching time TTC with a predetermined calculation cycle.

<Steering Wheel Maneuvering Request Condition Satisfied>

When the relative speed dSPD is constant, the predicted reaching time TTC decreases as the own vehicle 100 approaches the object 200. When the own vehicle 100 approaches the object 200, and the predicted reaching time TTC decreases to a predetermined time (i.e., a predetermined predicted reaching time TTC_T), the vehicle collision avoidance assist apparatus 10 determines that a steering wheel maneuvering request condition or a steering maneuvering request condition becomes satisfied. In other words, the vehicle collision avoidance assist apparatus 10 acquires the predicted reaching time TTC as an index value which represents a probability that the own vehicle 100 collides with the object 200 and when the index value becomes equal to or greater than a predetermined index value, the vehicle collision avoidance assist apparatus 10 determines that the steering wheel maneuvering request condition becomes satisfied. Thus, the index value representing the probability that the own vehicle 100 collides with the object 200 increases as the predicted reaching time TTC decreases.

<Setting of Collision Avoidance Route>

Figure 3C:
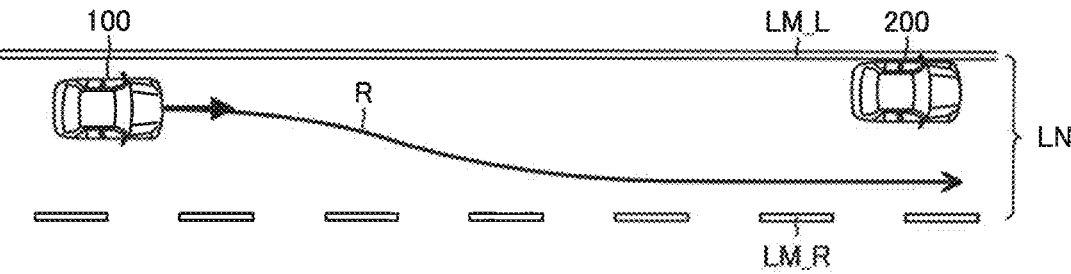
FIG. 3C is a view which shows a collision avoidance route.

When the vehicle collision avoidance assist apparatus 10 determines that the steering wheel maneuvering request condition becomes satisfied, the vehicle collision avoidance assist apparatus 10 sets a collision avoidance route R. As shown in FIG. 3C, the collision avoidance route R is a moving route of the own vehicle 100 which causes the own vehicle 100 to avoid the object 200, moving in the own vehicle moving lane LN. The collision avoidance route R shown in FIG. 3C is a route which passes the right side of the object 200. However, when there is a space at the left side of the object 200 which the own vehicle 100 can pass to avoid the object 200, moving in the own vehicle moving lane LN, a route which passes the left side of the own vehicle 100 may be acquired as the collision avoidance route R.

<Steering Wheel Maneuvering Notification Process>

In addition, when the vehicle collision avoidance assist apparatus 10 determines that the steering wheel maneuvering request condition becomes satisfied, the vehicle collision avoidance assist apparatus 10 starts executing a steering wheel maneuvering notification process or a steering maneuvering notification process.

Figure 4A:
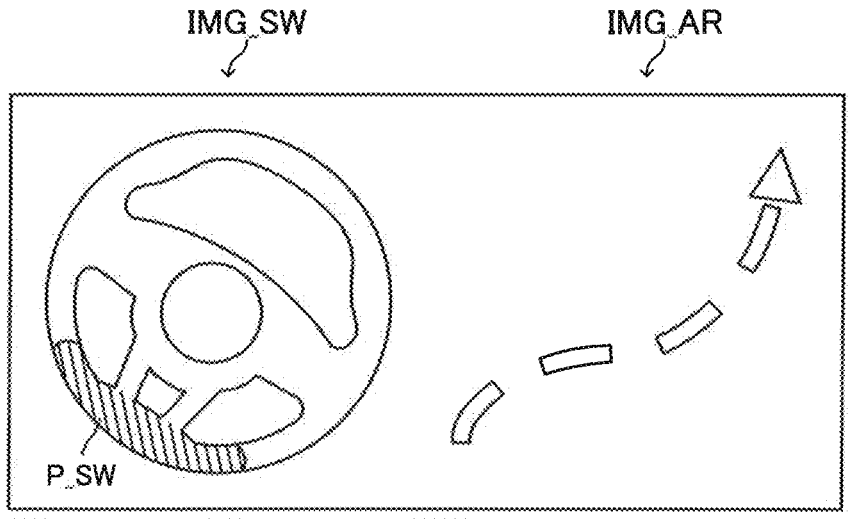
FIG. 4A is a view which shows a steering wheel image and an arrow image before a driver of the own vehicle starts carrying out a collision avoidance steering wheel maneuvering.

The steering wheel maneuvering notification process started at this moment is a notification process (i.e., a steering wheel maneuvering request notification process or a steering maneuvering request notification process) of notifying the driver of the own vehicle 100 of a necessity of carrying out a maneuvering of the steering wheel 53 to avoid the collision of the own vehicle 100 with the object 200, i.e., a collision avoidance steering wheel maneuvering or a collision avoidance steering maneuvering. As shown in FIG. 4A, in this embodiment, the steering wheel maneuvering notification process is realized by displaying a steering wheel image IMG_SW and an arrow image IMG_AG by the display apparatus 30. In other words, the steering wheel maneuvering notification process is realized by a steering wheel maneuvering request display process.

The steering wheel image IMG_SW is an image which illustrates a steering wheel. In particular, in this embodiment, the steering wheel image IMG_SW is an image which illustrates a steering wheel with a part of the steering wheel (in this embodiment, a lower part P_SW of the steering wheel) colored with prominent color such as red and rotated in a direction in which the own vehicle 100 needs to be turned to avoid the collision of the own vehicle 100 with the object 200. In other words, the vehicle collision avoidance assist apparatus 10 executes the steering wheel maneuvering request display process by causing the display apparatus 30 to display the steering wheel image IMG_SW illustrating the steering wheel and the direction in which the steering wheel needs to be maneuvered to avoid the collision of the own vehicle 100 with the object 200.

Further, the arrow image IMG_AR is an image which illustrates an arrow showing a route along which the driver needs to move the own vehicle 100 to avoid the collision of the own vehicle 100 with the object 200, i.e., the collision avoidance route R.

It should be noted that FIG. 4A shows an example that the driver needs to turn the own vehicle 100 right and then turn the own vehicle 100 left to move the own vehicle 100 straight in order to avoid the collision of the own vehicle 100 with the object 200. Thus, in this example, the steering wheel image IMG_SW is an image which illustrates the steering wheel maneuvered clockwise, and the arrow image IMG_AR is an image which illustrates the arrow curving right, then curving left, and then becomes straight.

It should be noted that the steering wheel image IMG_SW may include an image which illustrates an arrow showing the direction in which the driver needs to rotate the steering wheel 53 at a periphery of the image of the steering wheel.

Further, the vehicle collision avoidance assist apparatus 10 may be configured to execute only the steering wheel maneuvering request display process when the steering wheel maneuvering request condition becomes satisfied. However, in this embodiment, in addition to executing the steering wheel maneuvering request display process, the vehicle collision avoidance assist apparatus 10 executes, as the steering wheel maneuvering notification process, an output process of outputting an announcement from the announcement output apparatus 41, i.e., a steering wheel maneuvering request announcement output process or a steering maneuvering request announcement output process. The announcement output from the announcement output apparatus 41 at this moment is an announcement for prompting the driver to carry out the collision avoidance steering wheel maneuvering.

In addition, the vehicle collision avoidance assist apparatus 10 may be configured to execute the steering wheel maneuvering request display process only or execute the steering wheel maneuvering request display process and the steering maneuvering request announcement output process only when the steering wheel maneuvering request condition becomes satisfied. However, in this embodiment, in addition to executing the steering wheel maneuvering request display process or executing the steering wheel maneuvering request display process and the steering maneuvering request announcement output process, the vehicle collision avoidance assist apparatus 10 may be configured to execute, as the steering wheel maneuvering notification process, an output process of outputting an alert sound from the alert sound output apparatus 42, i.e., a steering wheel maneuvering request alert sound output process or a steering maneuvering request alert sound output process. The alert sound output from the alert sound output apparatus 42 at this moment is, for example, a buzzer sound.

As described above, when the vehicle collision avoidance assist apparatus 10 determines that the own vehicle 100 has a probability of colliding with the object 200, and the driver needs to carry out the collision avoidance steering wheel maneuvering, the vehicle collision avoidance assist apparatus 10 executes the steering wheel maneuvering request display process. Thereby, when the driver does not recognize the necessity of carrying out the collision avoidance steering wheel maneuvering, the vehicle collision avoidance assist apparatus 10 can cause the driver to recognize the necessity of carrying out the collision avoidance steering wheel maneuvering. Thus, the vehicle collision avoidance assist apparatus 10 can cause the driver to start the collision avoidance steering wheel maneuvering at an early timing and as a result, avoid the collision of the own vehicle 100 with the object 200 safely.

In addition, in this embodiment, when the vehicle collision avoidance assist apparatus 10 determines that the own vehicle 100 has a probability of colliding with the object 200, and the driver needs to carry out the collision avoidance steering wheel maneuvering, the vehicle collision avoidance assist apparatus 10 also executes the steering wheel maneuvering request announcement output process. Thus, the vehicle collision avoidance assist apparatus 10 can surely cause the driver to start the collision avoidance steering wheel maneuvering at an early timing and as a result, surely avoid the collision of the own vehicle 100 with the object 200 with preventing a behavior of the own vehicle 100 from being unstable.

<Steering Wheel Maneuvering Assist Process Executed>

Figure 5A:
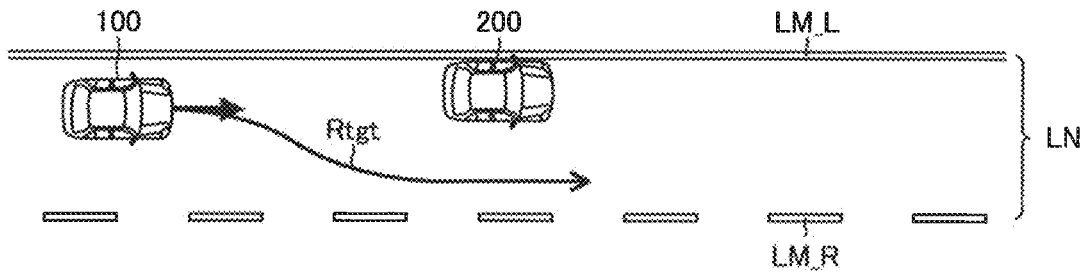
FIG. 5A is a view which shows a target collision avoidance route.

When the steering wheel maneuvering request condition becomes satisfied and then, a steering wheel maneuvering assist start condition or a steering maneuvering assist start condition becomes satisfied, the vehicle collision avoidance assist apparatus 10 sets, as the target collision avoidance route Rtgt, the latest collision avoidance route R acquired at the moment as shown in FIG. 5A. The steering wheel maneuvering assist start condition is satisfied when the steering wheel maneuvering request condition is satisfied, and the vehicle collision avoidance assist apparatus 10 detects the collision avoidance steering wheel maneuvering carried out by the driver, i.e., the driver starts the collision avoidance steering wheel maneuvering.

After the vehicle collision avoidance assist apparatus 10 sets the target collision avoidance route Rtgt, the vehicle collision avoidance assist apparatus 10 starts executing a steering wheel maneuvering assist process or a steering maneuvering assist process of controlling the steering torque TQ_S or the steering force output from the steering apparatus 23 so as to cause the own vehicle 100 to move along the set target collision avoidance route Rtgt.

In addition, when the vehicle collision avoidance assist apparatus 10 starts executing the steering wheel maneuvering assist process, the vehicle collision avoidance assist apparatus 10 acquires a current position of the own vehicle 100, based on the longitudinal acceleration value Gx, the lateral acceleration value Gy, the yaw rate YR, and the left and right lane markings LM and adjusts a content of notification realized by the steering wheel maneuvering notification process to notify the driver of a maneuvering of the steering wheel 53 necessary to move the own vehicle 100 along the target collision avoidance route Rtgt, based on the acquired current position of the own vehicle 100. Thus, the steering wheel maneuvering notification process executed after the vehicle collision avoidance assist apparatus 10 starts executing the steering wheel maneuvering assist process, is a steering wheel maneuvering assist notification process or a steering maneuvering assist notification process of notifying the driver of the own vehicle 100 of the collision avoidance steering wheel maneuvering of the steering wheel 53 to safely and surely avoid the collision of the own vehicle 100 with the object 200.

The vehicle collision avoidance assist apparatus 10 determines a rotation maneuvering direction in which the steering wheel 53 needs to be rotated to move the own vehicle 100 along the target collision avoidance route Rtgt, based on a positional relationship between the current position of the own vehicle 100 and the target collision avoidance route Rtgt. Then, the vehicle collision avoidance assist apparatus 10 causes the display apparatus 30 to display the steering wheel image IMG_SW illustrating the steering wheel rotated in the rotation maneuvering direction. In addition, the vehicle collision avoidance assist apparatus 10 causes the display apparatus 30 to display the arrow image IMG_AR, reducing a length of the arrow image IMG_AR and changing a shape of the arrow image IMG_AR to show an appropriate collision avoidance route, based on the positional relationship between the current position of the own vehicle 100 and the target collision avoidance route Rtgt. In addition, the vehicle collision avoidance assist apparatus 10 may cause the display apparatus 30 to display the arrow image IMG_AR, changing a thickness of the arrow image IMG_AR and/or the color of the arrow image IMG_AR.

Figure 4B:
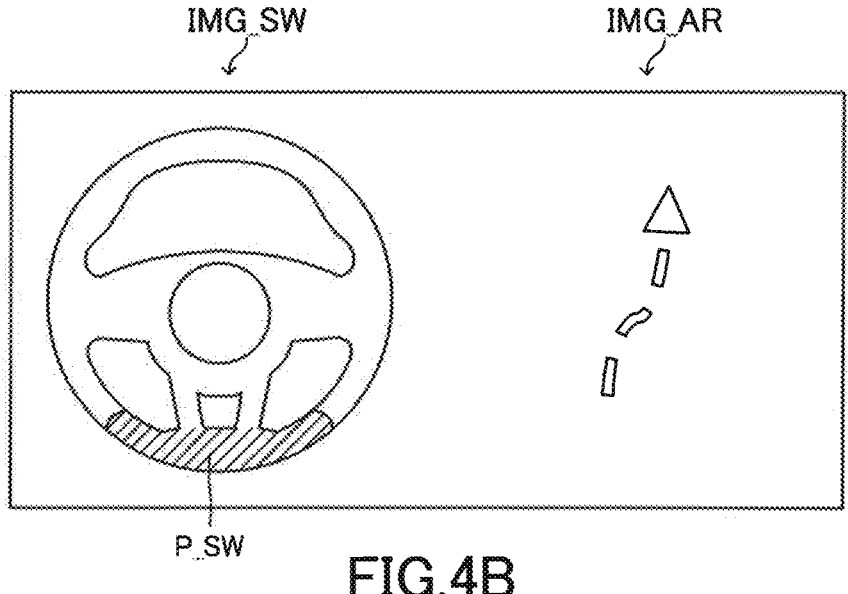
FIG. 4B is a view which shows the steering wheel image and the arrow image after the driver of the own vehicle starts carrying out the collision avoidance steering wheel maneuvering.

For example, when the driver starts the collision avoidance steering wheel maneuvering of turning the own vehicle 100 right and then, the vehicle collision avoidance assist apparatus 10 determines that the own vehicle 100 reaches a point where the own vehicle 100 needs to be turned left to move straight, the vehicle collision avoidance assist apparatus 10 causes the display apparatus 30 to display the steering wheel image IMG_SW illustrating the steering wheel positioned at the neutral position and the arrow image IMG_AR illustrating an arrow having a shorten length and a changed shape as shown in FIG. 4B.

In other words, when the own vehicle 100 needs to be turned in one direction (for example, in a right direction) and then, turned in an opposite direction (for example, in a left direction) in order to avoid the collision of the own vehicle 100 with the object 200, and the own vehicle 100 reaches a point where the own vehicle 100 needs to be turned in the opposite direction (in the left direction), the vehicle collision avoidance assist apparatus 10 execute a notification process of notifying the driver of the necessity of carrying out the collision avoidance steering wheel maneuvering of turning the own vehicle 100 in the opposite direction (in the left direction).

In addition, at this moment, the vehicle collision avoidance assist apparatus 10 executes, as the steering wheel maneuvering notification process, the steering wheel maneuvering assist announcement output process or the steering maneuvering assist announcement output process of outputting, from the announcement output apparatus 41, an announcement of prompting the driver to carry out a maneuvering of the steering wheel 53 to turn the own vehicle 100 left to move the own vehicle 100 straight. At this moment, the vehicle collision avoidance assist apparatus 10 may decrease a volume and a speed of the announcement output from the announcement output apparatus 41.

Thereby, the vehicle collision avoidance assist apparatus 10 can prompt the driver to carry out the desired collision avoidance steering wheel maneuvering to safely avoid the collision of the own vehicle 100 with the object 200 after the driver starts the collision avoidance steering wheel maneuvering.

It should be noted that the vehicle collision avoidance assist apparatus 10 may be configured to cause the display apparatus 30 to display the steering wheel image IMG_SW illustrating the steering wheel rotated in a direction for causing the own vehicle 100 to approach the target collision avoidance route Rtgt when the vehicle collision avoidance assist apparatus 10 determines that the own vehicle 100 deviates from the target collision avoidance route Rtgt by a predetermined distance or more after the driver starts the collision avoidance steering wheel maneuvering.

In other words, the vehicle collision avoidance assist apparatus 10 may be configured to execute the steering wheel maneuvering request notification process or the steering maneuvering request notification process of notifying the driver of the necessity of carrying out the collision avoidance steering wheel maneuvering of causing the own vehicle 100 to approach the target collision avoidance route Rtgt when the vehicle collision avoidance assist apparatus 10 determines that the own vehicle 100 deviates from the target collision avoidance route Rtgt by the predetermined distance or more after the driver starts the collision avoidance steering wheel maneuvering.

Thereby, the vehicle collision avoidance assist apparatus 10 can prompt the driver to carry out the desired collision avoidance steering wheel maneuvering to safely avoid the collision of the own vehicle 100 with the object 200 after the driver starts the collision avoidance steering wheel maneuvering.

Figure 5B:
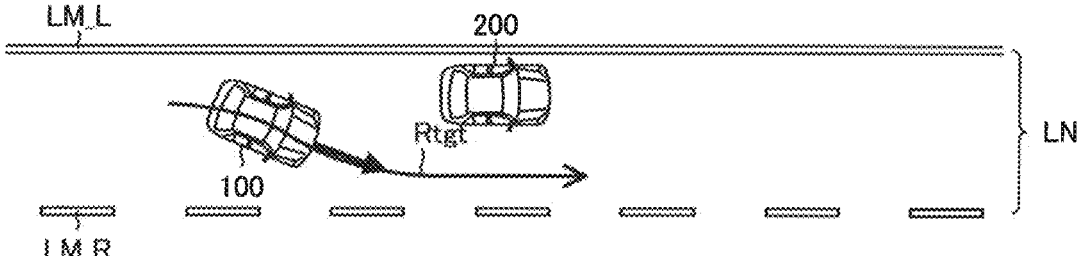
FIG. 5B is a view which shows a scene immediately after the driver of the own vehicle starts carrying out the collision avoidance steering wheel maneuvering.
Figure 5C:
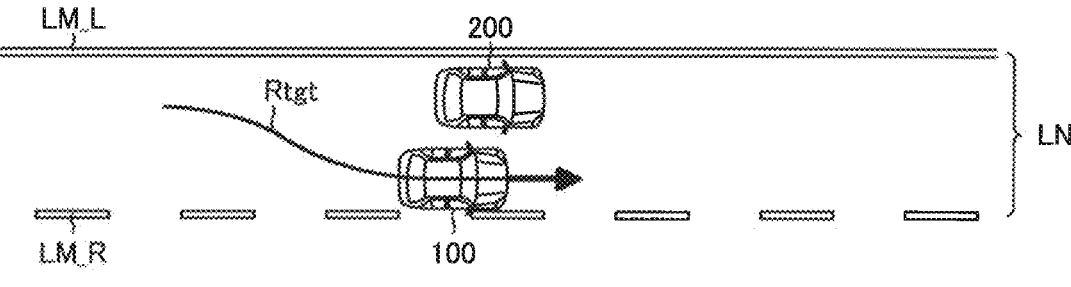
FIG. 5C is a view which shows a scene that the own vehicle moves, avoiding the object after the driver of the own vehicle starts carrying out the collision avoidance steering wheel maneuvering.

Thereby, as shown in FIG. 5B, the own vehicle 100 moves along the target collision avoidance route Rtgt and as shown in FIG. 5C, the collision of the own vehicle 100 with the object 200 is avoided.

It should be noted that the vehicle collision avoidance assist apparatus 10 forbids executing the steering wheel maneuvering assist process when there is no space at the side of the object 200 to safely move the own vehicle 100, avoiding the object 200 and thus, the vehicle collision avoidance assist apparatus 10 cannot set the target collision avoidance route Rtgt.

Further, the vehicle collision avoidance assist apparatus 10 may be configured to decelerate the own vehicle 100 by decreasing the driving torque or the driving force applied to the own vehicle 100 or limiting the driving torque or the driving force to a certain value or less, or applying the braking torque or the braking force to the own vehicle 100 in addition to executing the steering wheel maneuvering assist process.

Further, the vehicle collision avoidance assist apparatus 10 may be configured to execute a collision avoidance braking process or a PCS of avoiding the collision of the own vehicle 100 with the object by applying the braking force to the own vehicle 100 to forcibly stop the own vehicle 100 when the own vehicle 100 is going to collide with the object such as a person running out of behind the object 200 while the vehicle collision avoidance assist apparatus 10 executes the steering wheel maneuvering assist process. In addition, the vehicle collision avoidance assist apparatus 10 may be configured to execute a notification process of notifying the driver of a fact that the collision avoidance braking process is being executed while the vehicle collision avoidance assist apparatus 10 executes the collision avoidance braking process.

<Steering Wheel Maneuvering Assist Process Terminated>

Figure 6:
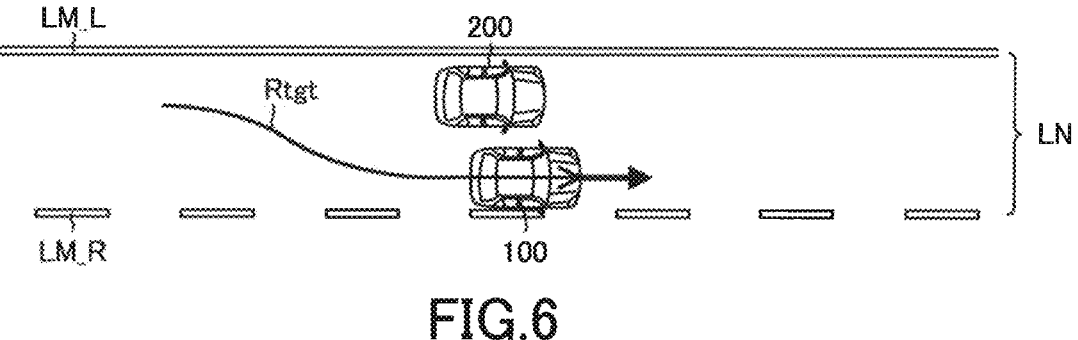
FIG. 6 is a view which shows a scene that a condition for terminating executing a collision avoidance steering wheel maneuvering assist process, becomes satisfied.

When a condition for terminating executing the steering wheel maneuvering assist process (i.e., a steering wheel maneuvering assist termination condition or a steering maneuvering assist termination condition) becomes satisfied, the vehicle collision avoidance assist apparatus 10 terminates executing the steering wheel maneuvering assist process. For example, if an execution of the steering wheel maneuvering assist process is terminated when the own vehicle 100 moves straight by the object 200 as shown in FIG. 6, the own vehicle 100 does not collide with the object 200. Accordingly, for example, a condition that the own vehicle 100 moves straight by the object 200 after the execution of the steering wheel maneuvering assist process is started, is set as the steering wheel maneuvering assist termination condition.

It should be noted that an absolute value of the yaw angle □yaw is small when the own vehicle 100 moves straight by the object 200. Accordingly, in this embodiment, the vehicle collision avoidance assist apparatus 10 is configured to determine that the own vehicle 100 moves straight by the object 200 when the absolute value of the yaw angle □yaw becomes equal to or smaller than a predetermined yaw angle after the vehicle collision avoidance assist apparatus 10 starts executing the steering wheel maneuvering assist process. Further, when the own vehicle 100 moves straight by the object 200, an absolute value of the yaw rate YR of the own vehicle 100 is small. Accordingly, the vehicle collision avoidance assist apparatus 10 may be configured to determine that the own vehicle 100 moves straight by 200 when the absolute value of the yaw rate YR of the own vehicle 100 becomes equal to or smaller than a predetermined yaw rate.

Furthermore, when the vehicle collision avoidance assist apparatus 10 is configured to execute the steering wheel maneuvering assist process with braking the own vehicle 100 to stop the own vehicle 100, the vehicle collision avoidance assist apparatus 10 may be configured to determine that the steering wheel maneuvering assist termination condition becomes satisfied when the own vehicle 100 is stopped.

Furthermore, the vehicle collision avoidance assist apparatus 10 may be configured to stop executing the steering wheel maneuvering assist process when the driver input torque TQ_S_driver becomes equal to or greater than a predetermined torque TQ_T while the vehicle collision avoidance assist apparatus 10 executes the steering wheel maneuvering assist process.

The summary of the operations of the vehicle collision avoidance assist apparatus 10 has been described.

<Specific Operations of Vehicle Collision Avoidance Assist Apparatus>

Next, specific operations of the vehicle collision avoidance assist apparatus 10 will be described. The CPU of the ECU 90 of the vehicle collision avoidance assist apparatus 10 is configured or programmed to execute a routine shown in FIG. 7 with a predetermined calculation cycle. Thus, at a predetermined timing, the CPU starts executing a process from a step 700 of the routine shown in FIG. 7 and proceeds with the process to a step 705 to determine whether the steering wheel maneuvering request condition is satisfied.

When the CPU determines "Yes" at the step 705, the CPU proceeds with the process to a step 710 to start executing the steering wheel maneuvering notification process. Then, the CPU proceeds with the process to a step 715 to set a value of a notification flag X1 to "1". The value of the notification flag X1 is set to "1" when the execution of the steering wheel maneuvering notification process is started. On the other hand, when the execution of the steering wheel maneuvering notification process is terminated, the value of the notification flag X1 is set to "0". Then, the CPU proceeds with the process to a step 725.

On the other hand, when the CPU determines "No" at the step 705, the CPU proceeds with the process to a step 720 to determine whether the value of the notification flag X1 is "1".

When the CPU determines "Yes" at the step 720, the CPU proceeds with the process to the step 725.

When the CPU proceeds with the process to the step 725, the CPU determines whether a value of an assist flag X2 is "0". The value of the assist flag X2 is set to "1" when the execution of the steering wheel maneuvering assist process is started. On the other hand, when the execution of the steering wheel maneuvering assist process is terminated, the value of the assist flag X2 is set to "0".

Figure 8:
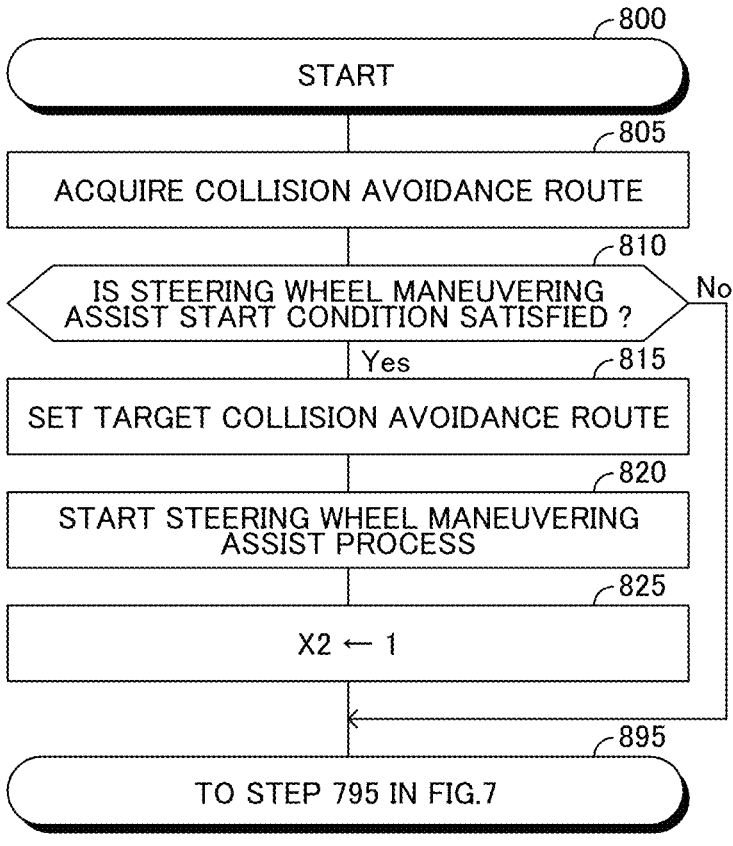
FIG. 8 is a view which shows a flowchart of a routine executed by the vehicle collision avoidance assist apparatus according to the embodiment of the invention.

When the CPU determines "Yes" at the step 725, the CPU proceeds with the process to a step 730 to execute a routine shown in FIG. 8. Thus, when the CPU proceeds with the process to the step 730, the CPU starts executing a process from a step 800 of the routine shown in FIG. 8 and proceeds with the process to a step 805 to acquire the collision avoidance route R. Then, the CPU proceeds with the process to a step 810 to determine whether the steering wheel maneuvering assist start condition is satisfied. That is, the CPU determines whether the driver carries out the collision avoidance steering wheel maneuvering.

When the CPU determines "Yes" at the step 810, the CPU proceeds with the process to a step 815 to set the collision avoidance route R acquired at the step 805 to the target collision avoidance route Rtgt. Then, the CPU proceeds with the process to a step 820 to start executing the steering wheel maneuvering assist process. Then, the CPU proceeds with the process to a step 825 to set the value of the assist flag X2 to "1". Then, the CPU proceeds with the process to a step 795 of the routine shown in FIG. 7 via a step 895 to terminate executing this routine once.

Figure 7:
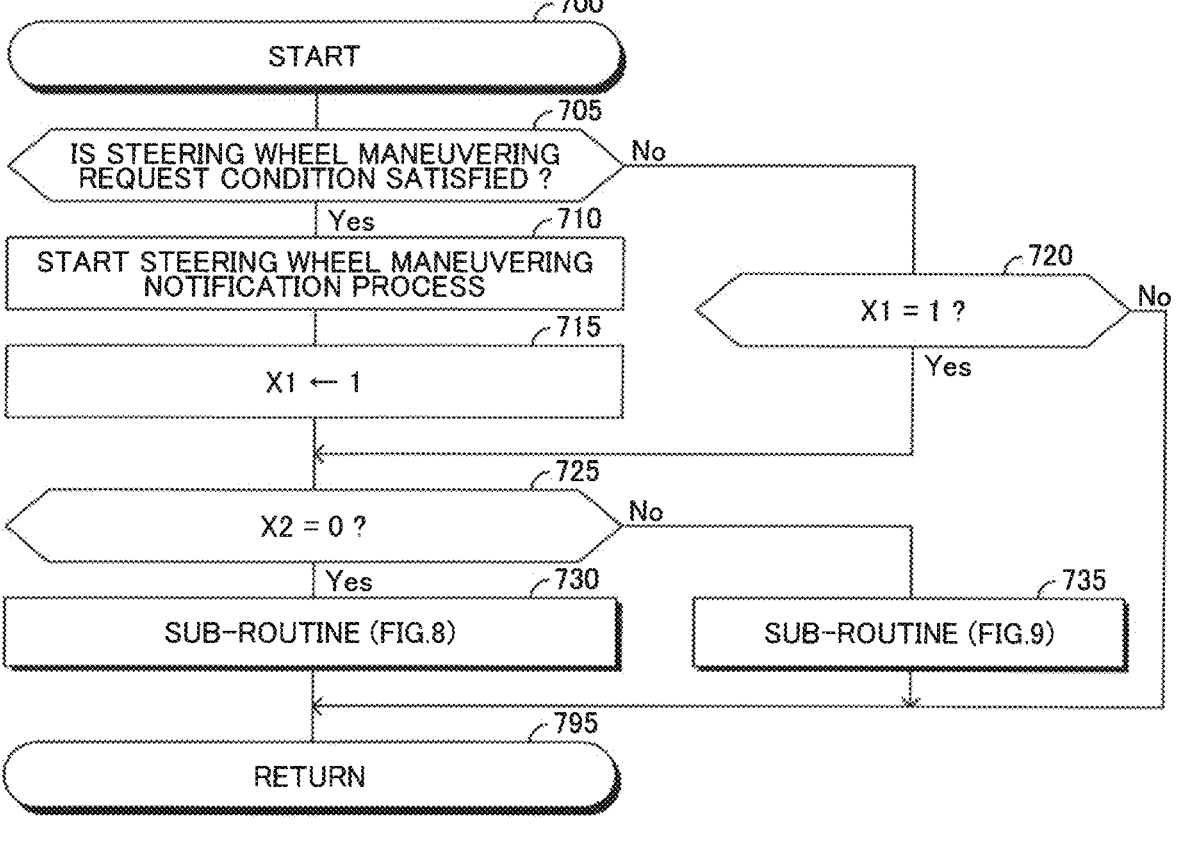
FIG. 7 is a view which shows a flowchart of a routine executed by the vehicle collision avoidance assist apparatus according to the embodiment of the invention.

On the other hand, when the CPU determines "No" at the step 810, the CPU proceeds with the process to the step 795 of the routine shown in FIG. 7 via the step 895 to terminate executing this routine once.

Figure 9:
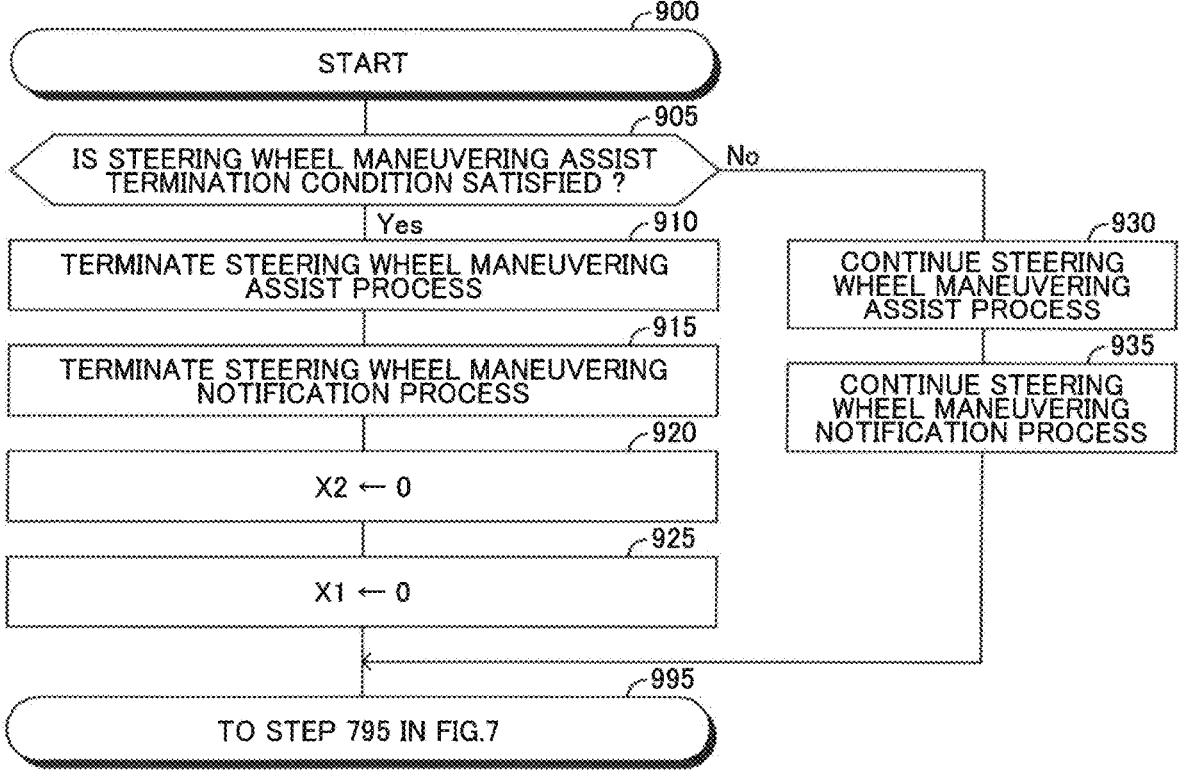
FIG. 9 is a view which shows a flowchart of a routine executed by the vehicle collision avoidance assist apparatus according to the embodiment of the invention.

Further, when the CPU determines "No" at the step 725 of the routine shown in FIG. 7, the CPU proceeds with the process to a step 735 to execute a routine shown in FIG. 9. Thus, when the CPU proceeds with the process to the step 735, the CPU starts executing a process from a step 900 of the routine shown in FIG. 9 and proceeds with the process to a step 905 to determine whether the steering wheel maneuvering assist termination condition is satisfied.

When the CPU determines "Yes" at the step 905, the CPU proceeds with the process to a step 910 to terminate executing the steering wheel maneuvering assist process. Then, the CPU proceeds with the process to a step 915 to terminate executing the steering wheel maneuvering notification process. Then, the CPU proceeds with the process to a step 920 to set the value of the assist flag X2 to "0". Then, the CPU proceeds with the process to a step 925 to set the value of the notification flag X1 to "0". Then, the CPU proceeds with the process to the step 795 of the routine shown in FIG. 7 via a step 995 to terminate executing this routine once.

On the other hand, when the CPU determines "No" at the step 905, the CPU proceeds with the process to a step 930 to continue executing the steering wheel maneuvering assist process. Then, the CPU proceeds with the process to a step 935 to continue executing the steering wheel maneuvering notification process. Then, the CPU proceeds with the process to the step 795 of the routine shown in FIG. 7 via the step 995 to terminate executing this routine once.

Further, when the CPU determines "No" at the step 720 of the routine shown in FIG. 7, the CPU proceeds with the process directly to the step 795 to terminate executing this routine once.

The specific operations of the vehicle collision avoidance assist apparatus 10 have been described.

It should be noted that the invention is not limited to the aforementioned embodiments, and various modifications can be employed within the scope of the invention.

What is claimed is:

1. A vehicle driving assist apparatus, comprising:
a surrounding information detection apparatus which detects information on a situation around an own vehicle including a situation ahead of the own vehicle; and
an electronic control unit configured to execute a collision avoidance steering maneuvering assist process of applying a steering force to an own vehicle to assist a collision avoidance steering maneuvering carried out by a driver of the own vehicle when there is a probability that the own vehicle collides with an object ahead of the own vehicle, and the driver carries out the collision avoidance steering maneuvering to steer the own vehicle to avoid a collision of the own vehicle with the object,
wherein the electronic control unit is configured to:
perform a first notification of notifying a driver of the own vehicle of a necessity of carrying out the collision avoidance steering maneuvering when the electronic control unit determines that there is the probability that the own vehicle collides with the object ahead of the own vehicle, based on the information detected by the surrounding information detection apparatus; and
when the own vehicle needs to be turned to one direction and then to an opposite direction to the one direction to avoid the collision of the own vehicle with the object, perform a second notification of notifying the driver of a necessity of carrying out the collision avoidance steering maneuvering to turn the own vehicle to the opposite direction and move the own vehicle straight.

2. The vehicle driving assist apparatus as set forth in claim 1, wherein when (i) the own vehicle needs to be turned to one direction and then to the opposite direction to the one direction to avoid a collision of the own vehicle with an object, and (ii) the own vehicle reaches a point where the own vehicle needs to be turned to the opposite direction, the electronic control unit is configured to perform the second notification.

3. The vehicle driving assist apparatus as set forth in claim 1, wherein the electronic control unit is configured to:
when (i) there is a probability that the own vehicle collides with an object ahead of the own vehicle, and (ii) the driver carries out a collision avoidance steering maneuvering to steer the own vehicle to avoid a collision of the own vehicle with the object, execute a collision avoidance steering maneuvering assist process of applying a steering force to the own vehicle to assist the collision avoidance steering maneuvering;
when the electronic control unit starts executing the collision avoidance steering maneuvering assist process, set, as a target collision avoidance route, a moving route of the own vehicle for avoiding the collision of the own vehicle with the object; and
when the own vehicle deviates from the target collision avoidance route by a predetermined distance, perform a third notification of notifying the driver of a necessity of carrying out the collision avoidance steering maneuvering to cause the own vehicle to approach the target collision avoidance route.

4. The vehicle driving assist apparatus as set forth in claim 3, wherein the vehicle collision avoidance assist apparatus comprises a display apparatus which displays an image, and wherein the electronic control unit is configured to perform a fourth notification of notifying the driver of the necessity of carrying out the collision avoidance steering maneuvering by causing the display apparatus to display the image which shows the necessity of carrying out the collision avoidance steering maneuvering.

5. The vehicle driving assist apparatus as set forth in claim 4, wherein the vehicle collision avoidance assist apparatus comprises a steering wheel maneuvered by the driver to steer the own vehicle, and wherein the electronic control unit is configured to perform the fourth notification of notifying the driver of the necessity of carrying out the collision avoidance steering maneuvering by causing the display apparatus to display the image illustrating the steering wheel with the image illustrating a direction in which the driver needs to maneuver the steering wheel to avoid the collision of the own vehicle with the object.

6. The vehicle driving assist apparatus as set forth in claim 1, wherein the vehicle collision avoidance assist apparatus comprises a display apparatus which displays an image, and wherein the first notification is a notification of causing the display apparatus to display a steering wheel image illustrating a steering wheel of the own vehicle and an arrow image illustrating an arrow having a first length and a first shape, and the second notification is a notification of causing the display apparatus to display the steering wheel image positioned at its neutral position and the arrow image having a second length shorter than the first length and a second shape changed from the first shape.

*    *    *    *    *